United States Patent [19]

Gould

[11] 4,191,722
[45] * Mar. 4, 1980

[54] METHOD OF MOLDING A COMPOSITE SYNTHETIC RESIN FOAM ROOFING STRUCTURE HAVING AN INTEGRAL SKIN THEREON

[76] Inventor: Walter M. Gould, 1731 Harriman La., Redondo Beach, Calif. 90278

[*] Notice: The portion of the term of this patent subsequent to Jul. 12, 1994, has been disclaimed.

[21] Appl. No.: 857,970

[22] Filed: Dec. 6, 1977

Related U.S. Application Data

[60] Continuation-in-part of Ser. No. 788,490, Apr. 18, 1977, abandoned, which is a division of Ser. No. 462,256, Apr. 19, 1974, Pat. No. 4,028,450, which is a continuation-in-part of Ser. No. 318,288, Dec. 26, 1972, abandoned, which is a continuation-in-part of Ser. No. 45,373, Jun. 11, 1970, abandoned.

[51] Int. Cl.² .............................................. B29D 27/04
[52] U.S. Cl. .................................. 264/45.5; 52/309.1; 52/540; 52/560; 249/96; 264/46.4; 264/46.7; 264/259; 264/278; 264/338; 264/DIG. 14

[58] Field of Search ............ 264/45.5, DIG. 14, 46.4, 264/46.7, 259, 278, 338; 249/96; 52/309.1, 540, 560

[56] References Cited

U.S. PATENT DOCUMENTS

| | | | |
|---|---|---|---|
| 3,099,516 | 7/1963 | Henrickson | 264/DIG. 14 |
| 3,813,463 | 5/1974 | Conger | 264/DIG. 14 |
| 3,925,526 | 12/1975 | Haas | 264/45.5 |
| 4,028,450 | 6/1977 | Gould | 264/45.5 |

*Primary Examiner*—Philip Anderson
*Attorney, Agent, or Firm*—Jessup & Beecher

[57] ABSTRACT

A synthetic foam roofing system having roofing sections with a relatively broad undersurface and exposed surface configured to resemble interlocked and overlapping roofing shingles. Ridge, valley, hip, starter gable and starter course shingles are all constructed in a manner similar to the roofing sections to interface and interlock with the roofing sections. The roofing sections and interfacing components may be affixed by conventional means such as nails and adhesives to roof boards, rafters or over old existing roofing structures utilizing wood batting.

8 Claims, 27 Drawing Figures

METHOD OF MOLDING A COMPOSITE SYNTHETIC RESIN FOAM ROOFING STRUCTURE HAVING AN INTEGRAL SKIN THEREON

This application is a continuation-in-part of application Ser. No. 788,490, filed Apr. 18, 1977, now abandoned; which in turn is a divisional application of application Ser. No. 462,256, filed Apr. 19, 1974, now U.S. Pat. No. 4,028,450; which in turn is a continuation-in-part of Ser. No. 318,288, filed Dec. 26, 1972, now abandoned; which in turn is a continuation-in-part of Ser. No. 45,373, filed June 11, 1970, now abandoned.

BACKGROUND OF THE INVENTION

The background of the invention will be set forth in two parts. The present invention generally pertains to the field of building construction and building remodeling, and more particularly to the field of roofing for residential buildings.

Over the years the use of man-made materials as replacement for naturally occurring materials, such as wood and slate for example, in order to reduce the cost of roofing has become increasingly popular. In fact, a very large industry has been developed to produce roofing using asphalt-based materials. These products have become very popular because of their ease of use and relatively low cost as compared with the aforementioned wood and slate and as also compared with traditional man-made tile roofing.

With the advent of plastics, much research has gone into adapting its use to the roofing industry. At first the synthetics were applied in sheet form only for their water-resistant qualities, but more recently attention has been focused on polystyrene and polyurethane foams for their heat and sound-insulating characteristics.

Probably the widest use of such latter foam which is formed from a foamable polyurethane resin reaction mixture is to apply it while in a liquid state by hose and spraying equipment directly onto a roof bed. This technique has proven itself to be very valuable for commercial building projects, but because of its cost and the fact that it is only practical on relatively flat roofs, and because it is not very pleasing aesthetically, it is not generally used as a residential roofing medium.

Noting the desirable heat and sound-insulating qualities, the industry has worked with the thermosetting polyfoams in the form of boards or large rectangular sheets having opposite broad flat surfaces from one to two inches in thickness. Invariably, impermeable plastic sheets or layers of felt and bituminous material are cemented or otherwise bonded to the roof support structure prior to laying down the foam boards so that water cannot seep through the seams between abutting ones of these boards. Also, protective layers are generally provided on the outer flat surface of the foam boards in order to lessen decomposition thereof when certain ones of the foam materials are exposed to wind, rain and sunlight.

Not only is this latter technique very complicated and costly, but also the results leave much to be desired as to eye appeal. Accordingly, it has been found that this flat-type construction is not generally desired by home owners and is seldom used.

In order to overcome this disadvantage and in order to eliminate the need for a truss element (since these panels lack strength to support themselves), a new scheme has developed whereby laminated plastic boards or panels, including a foam core, are bent to a desired curvature. Since a flat board of foamed polyurethane that has been arched or curved has a strong tendency to assume its original flat shape, a structural tie must necessarily be provided between the inner and outer layers of the curved panel material to hold the panel at the desired curvature. This can be accomplished, for example, by piercing the foam with a number of holes at predetermined intervals and filling the holes with a fiber glass resin composition to chemically bond with the same material coated on the surfaces of the foam.

SUMMARY OF THE INVENTION

In view of the foregoing factors and conditions characteristic of the prior art, it is a primary object of the present invention to provide a new and improved method for molding a roofing material retaining all of the advantages but not subject to the disadvantages of the prior art.

It is another object of the present invention to manufacture a form-molded synthetic foam roofing material having very good heat and sound-insulating characteristics.

It is also another object of the present invention to manufacture a strong and economical-to-fabricate molded synthetic roofing.

It is a further object of the invention to manufacture relatively lightweight and waterproof molded synthetic roofing material utilizing synthetic foam having an exposed outer surface resembling conventional naturally-occurring and man-made roofing.

It is yet another object of this invention to manufacture form-molded synthetic foam roofing in any of various aesthetically pleasing configurations, including European tile and slate.

According to the present invention, a form-molded synthetic foam roofing structure is united in process to a support structure, including a relatively broad surface to be affixed to a roof support structure. United in process to the support structure is a form-molded synthetic foam roofing section having a relatively broad undersurface, the roofing section having an exposed surface configured to resemble a plurality of interlocked and overlapping roofing shingles.

In addition to providing a roofing section, the invention disclosed herein provides for ridge, valley, hip, as well as starter gable and starter course shingles to disclose a complete roofing system constructed to provide a durable frame-retardant and weather-resistant roof covering. The ridge, valley, starter gable, and starter course shingles are formed according to the same principles as the roofing sections and are constructed to interlock or interface therewith in a manner which will be described in greater detail herein.

The roofing system disclosed has ecological and energy-conservation advantages, as well as providing improved insulation and safety. The roofing system saves wood used for wood shingles and petroleum products used for composition shingles.

The features of the present invention which are believed to be novel are set forth with particularity in the appended claims. The present invention, both as to its organization and manner of operation, together with further objects and advantages thereof, may best be understood by making reference to the following description, taken in connection with the accompanying drawings, wherein like reference numbers are used to identify like parts in the several views.

BRIEF DESCRIPTION OF THE DRAWINGS

FIG. 1a is a perspective view of a section of form-molded synthetic foam roofing constructed in accordance with the present invention;

FIG. 1b is a partial sectional illustration of rear section of the form-molded synthetic foam shingle in accordance with the invention taken on line 1b—1b of FIG. 1a;

FIG. 1c is a partial sectional illustration of rear and front sections of the form-molded synthetic foam shingles in accordance with the invention being mounted onto the sub-roof and taken generally in the same plane as FIG. 1b;

FIG. 2b is a partial sectional illustration of right and left sections of the form-molded synthetic foam shingles being mounted on the sub-roof in accordance with the invention and is in effect an enlarged fragment of the center portion of FIG. 2a;

DETAILED DESCRIPTION OF THE PREFERRED EMBODIMENT

Figures 1A, 1B:
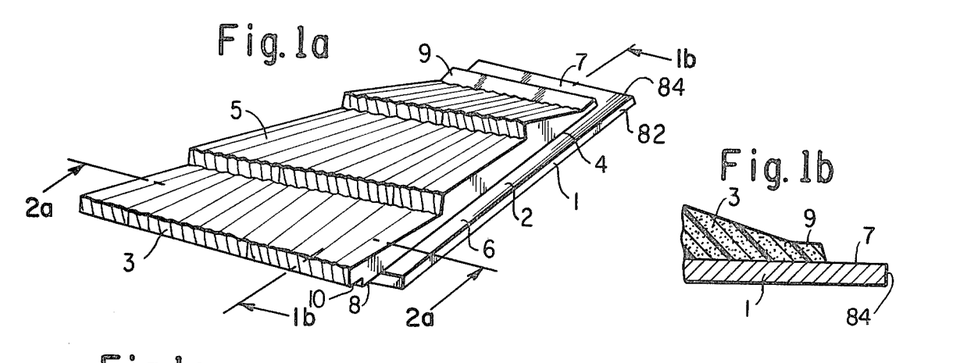

With reference now to the drawing and more particularly to FIG. 1a, there is shown, preferably of somewhat porous material, such as plywood, pressed wood, masonite, for example, upon an upper broad surface 2 of which is united in process a form-molded synthetic foam roofing section 3. The section 3 has a relatively broad undersurface 4 united in process to the surface 2 of support base member 1 and also has an exposed outer surface 5 configured (by the shape of the process mold 31) to resemble a plurality of interlocked and overlapping roofing shingles or tiles.

It will be noted that a side portion 6 of the support base member 1 extends beyond the form-molded synthetic foam section 3 and also at the rear portion 7. At the same time, it will be noted that the forwardmost portion 8 of the foam section 3 extends beyond the base member 1 as does the left-side portion 21 as seen in FIG. 2a.

FIG. 1b gives a cross-section of the rear portion of the form-molded synthetic foam shingle. It will be noted that a flat step portion 9 will be interlocking with front step section 10 of another form-molded synthetic foam shingle, as shown in FIG. 1c.

Figures 1C, 2B:
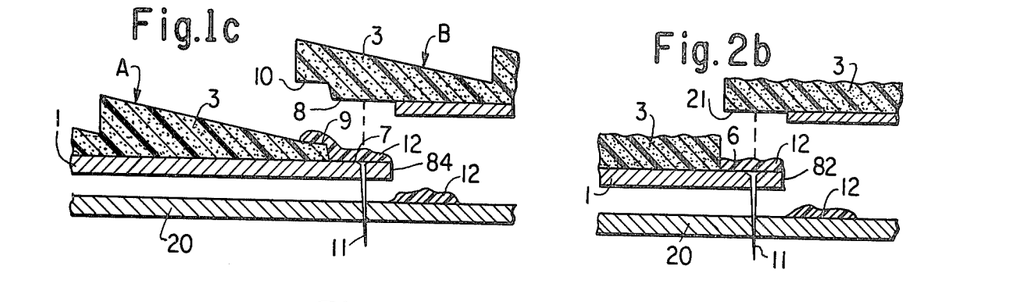

FIG. 1c demonstrates how form-molded synthetic foam shingles A and B could be mounted or attached to rafters, sub-roof or existing roofing 20. Synthetic foam shingle A is first placed on sub-roof 20; then nails 11 are driven through sections 6 and 7 of support base member 1 into sub-roof 20. After form-molded synthetic foam shingle A has been secured to sub-roof 20, then waterproof adhesive 12 is placed along flange sections 7 and 9 and also sub-roof 20. Now form-molded synthetic foam shingle B is placed so that it interlocks portions 8 and 10 onto portions 7 and 9 of shingle A and is secured by adhesive 12.

Figure 2A:
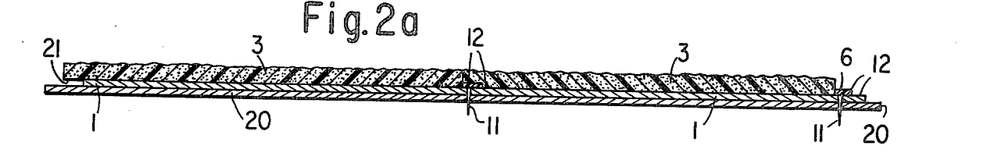
FIG. 2a is a partial sectional illustration of a roofing construction utilizing form-molded synthetic foam roofing materials in accordance with the invention.

In FIG. 2a the form-molded synthetic foam shingles would be secured in the same manner as described in FIG. 1c. FIG. 2b shows left-side portion 21 fitting on top of right-side portion 6.

Adhesives may be used to secure the form-molded synthetic foam shingle to the sub-roof wherever nails could not be used, such as the leading edge.

Figure 3:
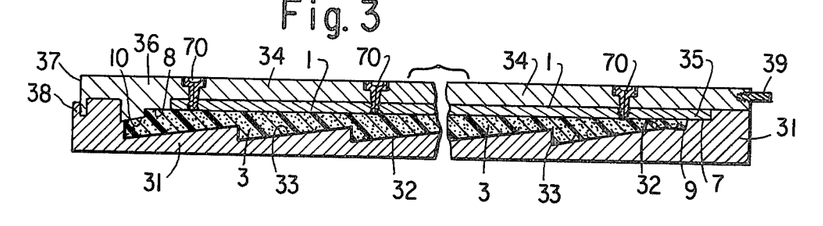
FIG. 3 is a partial view in cross-section of a form mold made of metal with stepped pressure plate illustrating the stepped front and rear sections and the present form-molded synthetic foam roofing construction formed therein.
Figure 4:
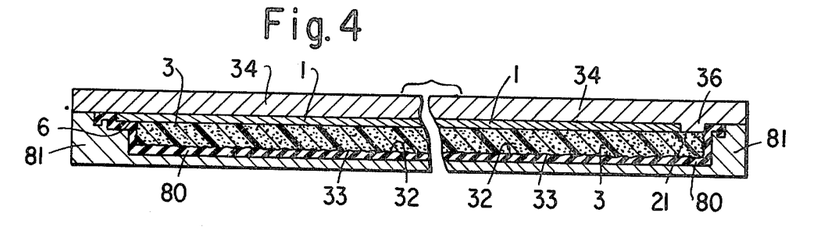
FIG. 4 is a partial view in cross-section of a form mold made with a silicone rubber insert with stepped pressure plate illustrating the stepped side sections and the present form-mold synthetic foam roofing construction formed therein.
Figure 5:
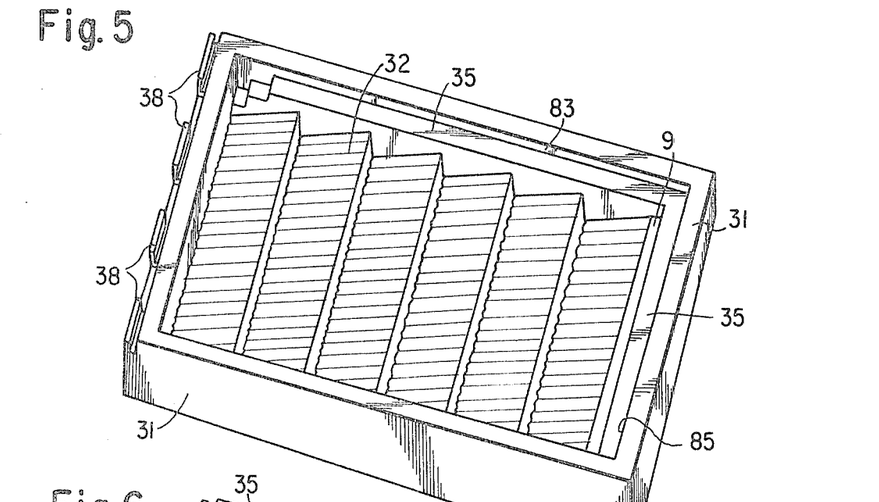
FIG. 5 is a perspective view of a form mold illustrating the cavity that would give the finished product the outer surface of interlocking wood shingles. The view also illustrates the interstepped edges and key system that would give protruding edges of the base member to the finished product.

With reference to FIG. 3, a form mold 31 is shown having a contour 32 designed to provide a tile or shingle configuration. For example, the contour 32 in this embodiment of the invention produces a wood shake roof design in the outer surface 5, as seen in FIG. 1a.

In fabricating the form-molded synthetic foam roof section, a barrier coat of 10 to 30 thousandths (mils) is first applied to the mold surface 32 of mold 31, which may have a parting agent thereon. This barrier coat 33 could be in the form of acrylic paint when a silicone rubber insert 80 is used. However, a polymerized acrylic is preferred. Wax, fluorocarbon spray, silicone lubricant or any of the known forms of parting agents may be used on the mold surface 32 when mold 31 is made of hard materials, such as metal or epoxy. Teflon is particularly suitable as a parting agent on metal.

Figure 6:
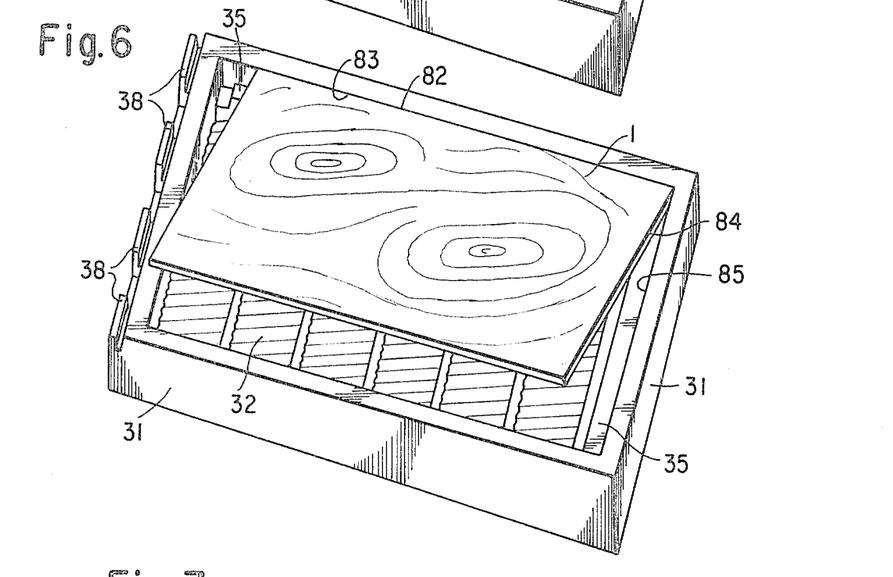
FIG. 6 is a perspective view of a form mold illustrating the positioning of the base member onto and into the cavity of the form mold.
Figure 7:
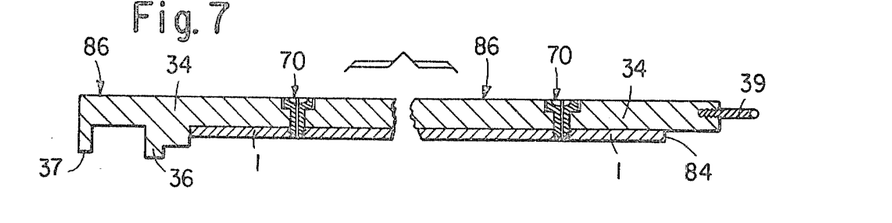
FIG. 7 is a partial sectional illustration of the pressure plate assembly taken from FIG. 8, showing the key-stepped system of the pressure plate that locks and also gives exposed edges to the base member and foam of the finished product, and the attachment of the base member to the pressure plate.
Figure 8:
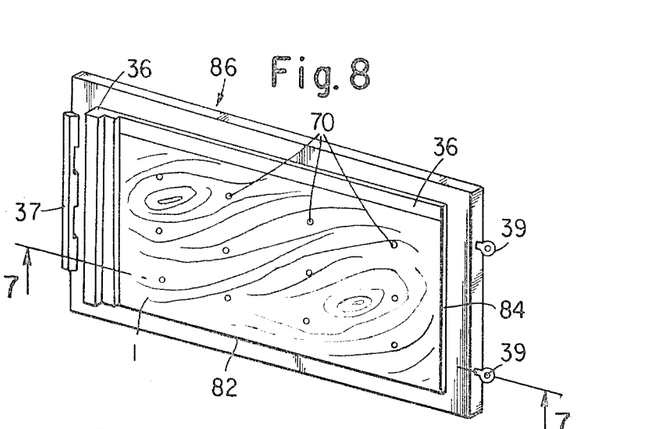
FIG. 8 is a perspective view of the pressure plate assembly illustrating the stepped surface that keys into the form mold and also the base member affixed into position on the pressure plate.

After the barrier coat is dry, the mold is chilled in a suitable environment, such as a chilling compartment. The temperature of the chilling environment should be controlled to prevent condensation on the surface of the mold as moisture can upset and damage the foam during curing. The temperature controlled chilling of the mold retards curing, initially, at the surface contact between the mold and foam, creating a thick, protective, resistant skin. In most cases a temperature of 10°–30° F. below ambient temperature (i.e. normal room temperature, generally in the range of 70°–80° F.) will be sufficient to chill the mold without any significant condensation on the mold surfaces. When the barrier coat 33 is dry, then liquid synthetic foam, such as a foamable thermosetting resin reaction mixture, e.g. a foamable polyurethane resin reaction mixture, is poured or injected (sprayed) into the cavity of mold 31 on top of barrier coat 33. The base member 1 is then fitted onto the stepped section 35 of the cavity of mold 31, as shown in FIG. 6. This can be done by hand placing. Note that base member 1's edge 82 is placed against step 35 and 83 of mold 31 at the same time edge 84 of base member 1 is butted against step 35 and 85 and then lowered into place, or by attaching the base member 1 to pressure plate 34 as shown in FIG. 7. Note that base member 1 will be fitted into the stepped portion 36 of pressure plate 34 as shown in FIG. 8. Attachment can be done by fasteners, such as attachment vent screws 70 (shown in FIG. 10) through pressure plate 34 and into base member 1 as shown in FIGS. 3, 7 and 11. Attachment will be done prior to pouring the foam 3 into the mold cavity of mold 31. The hand placing of base member 1 and pressure plate 34, or the lowering of pressure plate 34 with base member 1 attached onto mold 31 is done before foam 3 starts to rise or expand. This positioning of the base member 1 in and onto the stepped section 35 of the mold cavity of mold 31 will provide exposed base portions 6 and 7 of the finished product. The stepped sections 36 of pressure plate 34 will provide interlocking edges 8, 10 and 21 of the foam 3 portion of the finished product. The step will also act as a key to locate and prevent sliding movement of the pressure plate 34 to mold 31. This will also prevent mismatched finished products. The pressure plate 34 then will be secured to the mold 31 by clamps, conveyor rollers 40, 46, as shown in FIG. 14 or by other means. During the expansion of the synthetic foam, which occurs shortly after being poured, the shape of the shingle is permanently formed, and, at the same time, the synthetic foam enters into the pores of the base member 1 and adheres to the barrier coat 33, uniting the base member 1, barrier coat 33 and synthetic foam section 3 as one.

When the cure cycle of the synthetic foam is completed, the clamps will be removed from the pressure plate 34 and mold 31. The pressure plate 34 will be removed from mold 31. If a silicone rubber insert 80 is used, it will be stripped from the foam section 3, base member 1 and pressure plate 34. The attachment vent screws 70 will be removed from the pressure plate 34. Then the finished product is removed from the pressure plate 34 and is ready for use or to be stored for future use. Color of the form-molded synthetic roofing section can be predetermined by either using pigments in the synthetic foam or in the barrier coat 33, or both. It will be noted that matching is not required to produce the finished product.

Figure 9:
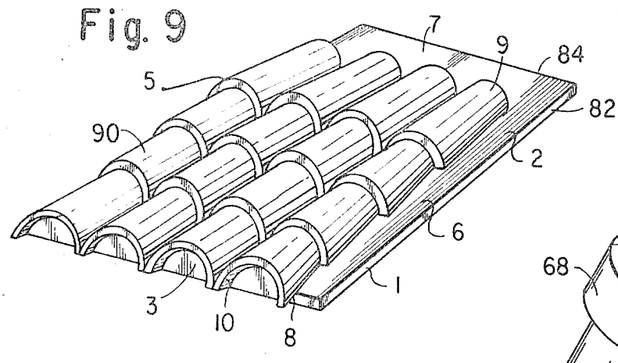
FIG. 9 is a perspective view showing a section of a form-molded synthetic foam roofing construction in the form of Spanish tile.

As noted above, any exposed surface configuration 5 may be provided by an appropriate form mold contour surface 32. Thus, the exposed surface 5 of the form-molded synthetic foam section 3 may resemble a plurality of interlocking and overlapping Spanish tiles 90, as illustrated in FIG. 9. It should, therefore, be obvious that Mission, as well as any of the popular English, French, German, etc. tiles and shingles may be fabricated, only limited by the imagination of the designer.

Figure 10:
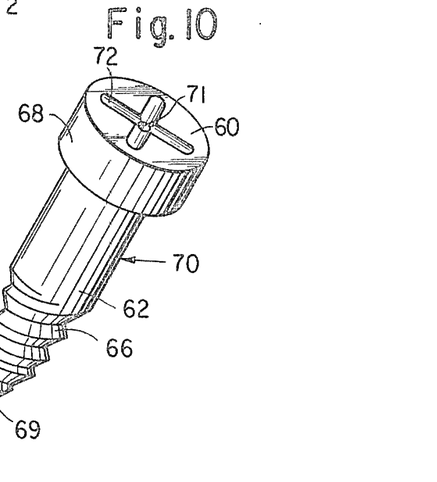
FIG. 10 is a perspective view illustrating the attachment vent screw.
Figure 11:
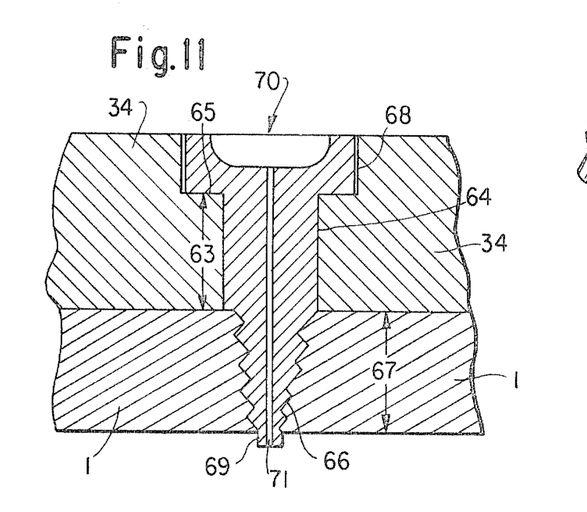
FIG. 11 is a partial view in cross-section of an attachment vent screw and pressure plate taken from FIG. 7.
Figures 12, 14:
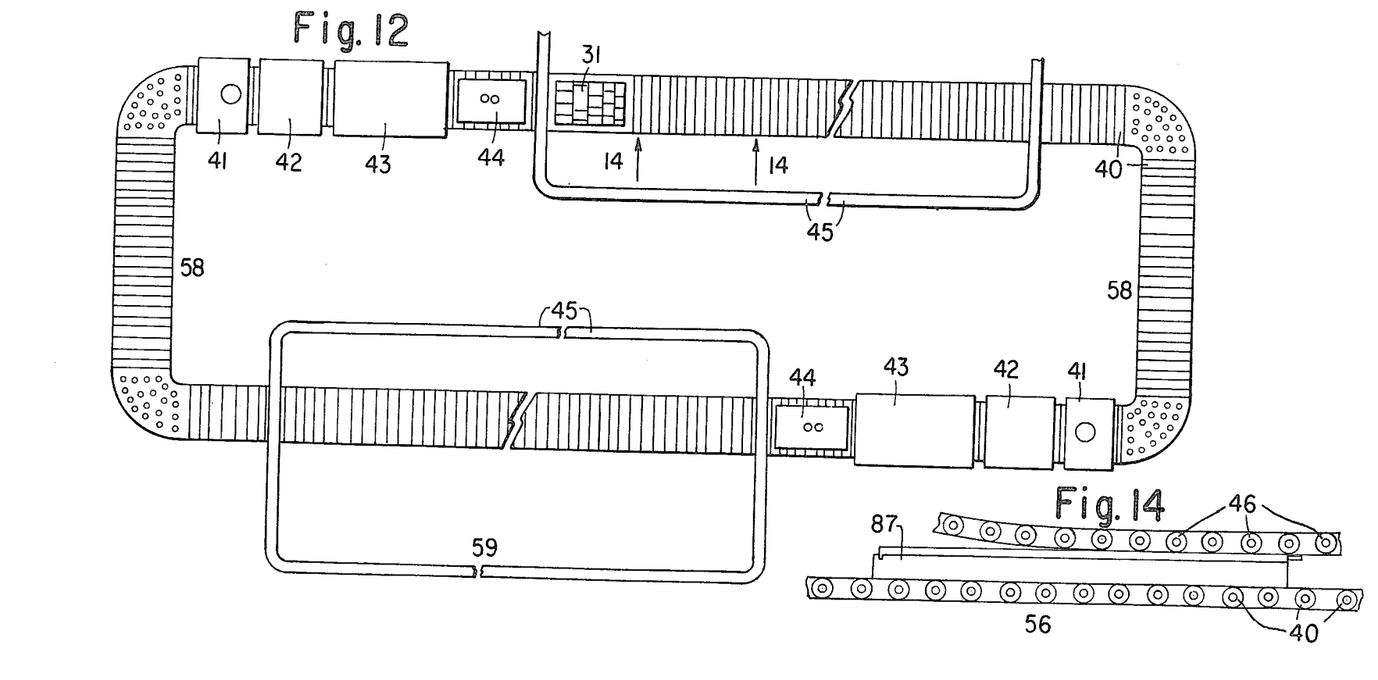
FIG. 12 is a plan view of a conveyor system for producing form-molded synthetic foam roofing structure according to this invention.
FIG. 14 is a partial view taken on line 14—14 of FIG. 12, illustrating mold assembly entering secure rollers of the securing station area in the conveyor system.

For fastening the base member 1 to the pressure plate 34, attention is given to FIGS. 10 and 11, the attachment vent screw 70. The attachment vent screw 70 has a round diameter head 60 and is slotted for conventional type screw drivers. Phillips slot is shown 72 in FIG. 10. The length of the screw head 68 shall not be greater than the depth of the counter bored hole 65 in the pressure plate 34. Shank length 62 is the same as the thickness 63 of the pressure plate 34 after screw hole 64 has been counter bored 65. The thread 66 is that of a wood screw. The length is determined by the thickness 67 of the base member 1. The pilot shank 69 can be from 1/16 to ⅛ inch in length. The diameter of the vent hole 71 should be small, #40 drill size would be sufficient. The vent hole 71 is to vent trapped air, not synthetic foam 3. The small vent hole in preventing the foam 3 from escaping will cause the foam 3 to pack to a greater density.

Figure 13:
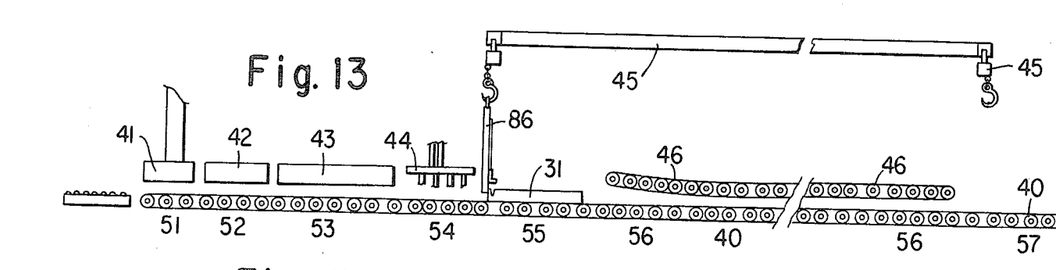
FIG. 13 is an elevational view of apparatus and conveyor system.

A method of continuous production is illustrated in FIGS. 12 and 13. The conveyor system components that are utilized are widely known and obtainable. The spray booth 41 could be either manual or automated. There are numerous devices available to spray parting agents or barrier coatings. The spray booth should be equipped with an exhaust ventilation system. The drying compartment 42 would have electric heating elements and fans to circulate the air. A thermostat would be used to control the heat. The chilling compartment 43 is equipped with refrigeration units capable of quick chilling of the surface 32 of mold 31. Sensors would be used to check the surface temperature and also control station area 53 of the conveyor system. The foam spraying apparatus 44 will have sufficient number of nozzles to give a quick, even distribution of foam into the mold cavity. The overhead conveyor system 45 can be any of the many that are available. It should be equipped with a rapid hoist. The roller system 40 should have sufficient strength to support mold assembly 86. It will be equipped with timing devices that control the advance of the mold 31 and mold assembly 87. In the securing station area 56 of the roller system, the upper rollers 46 will be coated to prevent the excess foam that might escape from the attachment vent screws 70 from adhering to the rollers 46. The distance between the upper rollers 46 and the lower rollers 40 would be the thickness of the mold assembly 87.

The sequence of the process is that mold 31 enters the spray booth 41 at station area 51, at which time a parting agent or barrier coat 33 is sprayed onto the surface of the cavity of mold 31. The mold 31 then proceeds to the drying compartment 42 at which time the barrier coat 33 (acrylic paint) is thoroughly dried. Upon leaving the drying station area 52, the mold 31 then enters the chilling compartment 43. The surface of the cavity of mold 31 is quickly chilled. The chilling will cause a retarding action in the foam 3. This will give a thicker surface skin, eliminating the use of two densities of synthetic foam and allowing more time to fit the pressure plate 34 to the mold 31. The mold 31 then travels to station area 54 where foam 3 is sprayed into the cavity of mold 31. The mold 31 then proceeds to station area 55. The pressure plate assembly 86 is then partly lowered so that the male half hinge 37 is fitted into the female half hinge 38 of mold 31. After contact is made the pressure plate assembly 86 is then lowered on top of mold 31 making mold assembly 87. The lowering hooks are then removed from the attachment eyes 39 of the pressure plate 34. The mold assembly 87 then travels to the securing station area 56. When entering this area the mold assembly 87 is secured by the downward pressure of the upper rollers 46 shown in FIG. 14. During the travel through area 56 the synthetic foam expands, forcing itself into the pores of the base member 1 and also making its permanent shape from the mold 31 and pressure plate 34. The trapped air escapes through the attachment vent screws 70. The cure cycle begins and ends during the travel in securing area 56. Upon leaving the securing area 56, the mold assembly 87 is ready to be disassembled. The hanger hooks are lowered from the overhead conveyor 45 and attached to the pressure plate hook eyes 39. Then the pressure plate assembly 86 is hoisted off the mold 31. If a silicone rubber insert 80 is used, it is also lifted from the mold casing 81 with the pressure plate assembly 86. The mold 31 is then inspected and any foam flash is removed. The mold 31 is then sent through the system again. If a silicone rubber insert 80 is used, a clean silicone rubber insert 80 is placed in the mold casing 81 and is then sent through the system.

The attachment vent screws 70 are removed from the pressure plate 34 that is hanging on the overhead conveyor 45. The finished product is then removed. If a silicone rubber insert 80 is used, it is stripped from the pressure plate assembly 86 before the attachment vent screws 70 are removed. The pressure plate 34 is inspected and any flash is removed. The pressure plate 34 is then sent to station area 59 where a new base member 1 is attached to form a new pressure plate assembly 86; then it returns to conveyor station area 55. The finished product is sent to a storage area.

From the foregoing, it should be evident that there has been described and illustrated a ready-made, inexpensive, easily installed roofing material that is molded into the shape of natural (slate, wood, etc.) or more expensive man-made (clay tile) roofing products. The invention utilizes lightweight, self-skinning, closed cellular foam and back-up support material to add strength, such as plywood, for example, and be provided in various sizes and will drastically cut or reduce the installation time and labor cost so that the professional roofer and the layman alike can easily install a beautiful roof on a dwelling. The roof so provided will be both of weather and sound-proofing qualities and also act as a fire retardant because of this desirable characteristic of polyurethane and other closed cellular foam materials with fire-retardant properties.

Figure 15:
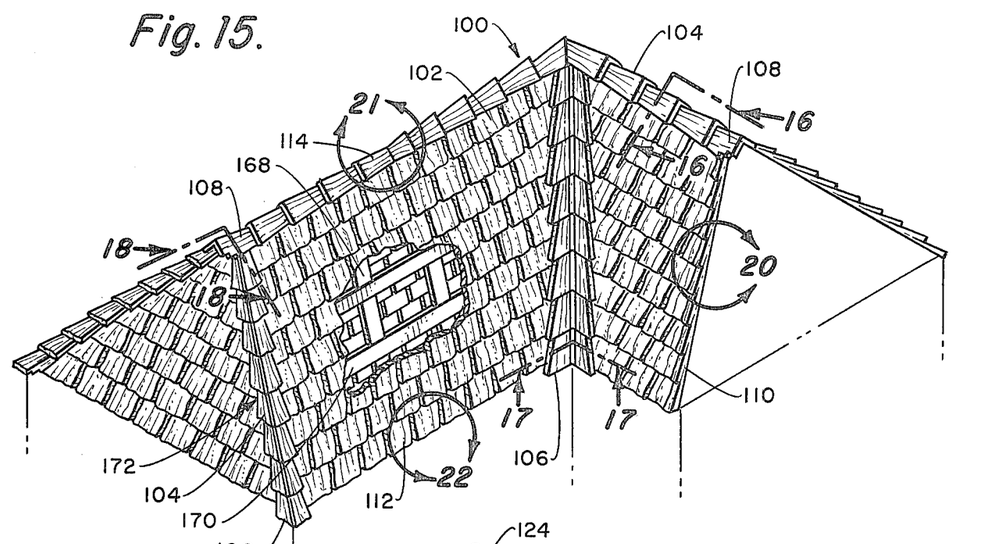
FIG. 15 illustrates a synthetic foam roofing system employing the principles of the invention for the roofing sections with the addition of special shingles.

The shingle sections constructed according to the details shown in FIGS. 1 through 6 are suitable for the flat portion 102 of a roof. However, there must be specialized shingles constructed utilizing the identical method and interlocking with the existing shingle sections in order to provide a roofing system as illustrated in FIG. 15. The roof shown in FIG. 15 is for illustration purposes only and shows the types of special shingles needed to fill in the edges, ridges, valleys, and hips on the normal roof. Many roofs constructed presently may employ one or more of all the different types of shingles necessary to meet the requirements. That is, some roofs are constructed with the hip and ridge construction while others have only the gable and ridge. Still others employ hips, ridges, gables and valleys. Therefore, to accommodate all these various constructions the specialized shingle constructions illustrated in FIGS. 16 through 22 have been conceived to mate with and interlock with the roofing sections constructed according to the principles of the invention. Likewise, these shingles shall also be constructed according to the principles and shall only differ in the manner in which they are constructed for their unique applications. In general, the shingles made according to the invention will all have various stepped portions which include base members during their manufacture. Further, every shingle will be constructed utilizing the unique method of chilling the mold to provide a retardant action in the surface of the foam, resulting in a very dense, integral surface skin eliminating the use of two densities of synthetic foam to provide a durable flame-retardant skin covering. That is, the unique method employed in manufacturing the shingles provides a single, homogeneous construction which is very dense at the surfaces contacting the chilled surfaces of the mold and decreases in density as the distance from the chilled portion of the mold increases. The chilling of the mold is controlled to prevent any condensation which would prevent the formation of the high-strength, dense, integral surface skin desired. Thus, the unique method provides a highly durable, flame-retardant, long-lasting shingle construction heretofore unknown.

Figure 16:
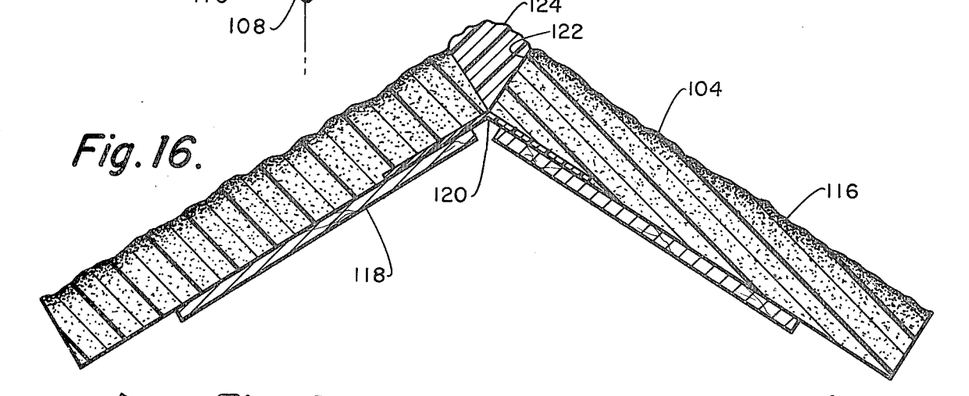
FIG. 16 is a sectional view illustrating the construction of a ridge shingle taken at 16—16 of FIG. 15.
Figure 17:
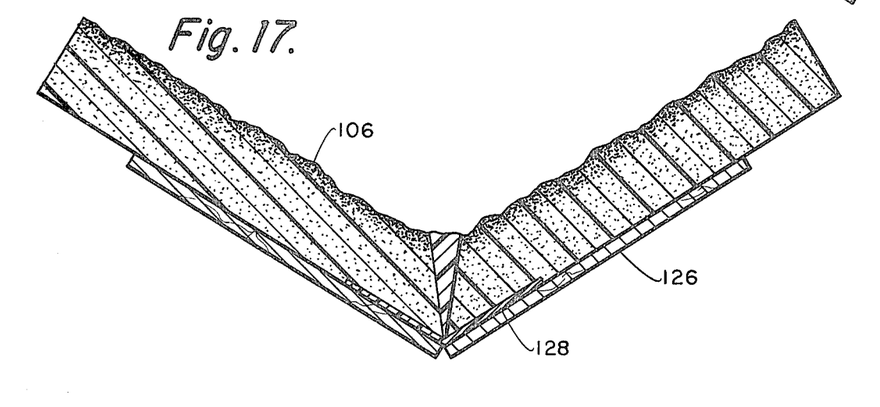
FIG. 17 illustrates a valley shingle and is a sectional view taken at 17—17 of FIG. 15.

Referring now to FIG. 15, the roof generally indicated at 100 has various shingles to cover particular sections. The flat portion of the roof 102 utilizes the roofing sections constructed according to the manner shown in FIGS. 1 through 6. However, specialized shingles need to be made to fit the purposes for bends, corners and edges of the roof. For the ridges, ridge shingles 104 are provided as illustrated in FIG. 16, while valley shingles 106 may be provided as shown in FIG. 17. For other specialized applications there are provided ridge terminal shingles 108, starter gable shingles 110, starter course shingles 112 and ridge cap shingles 114. Again, it is emphasized that these shingles are specially constructed to fit certain areas of the roofing system, but are made to conform to the same details of construction as the roofing sections 102. That is, they must be the same density, durability, having the same flame-retardant and durable properties of the roofing sections.

The ridge shingles 104 have the same high-density, durable, integral surface covering or skin 116 as the roofing sections 102, with the integrally united base plate 118. In order to allow the ridge shingle 104 to bend to fit the particular pitch of the roof, a flexible strip 120 is molded into the ridge shingle between the split base plate 118 and the foam shingle. The flexible strip 120 can be made of a suitable flexible plastic material capable of withstanding wide variations in the environmental temperatures and conditions without substantial deterioration. After installation on a particular ridge, the crevice 122 caused by the bend in ridge shingle 104 is filled with a suitable sealant 124.

The valley shingle 106 is constructed in a manner very similar to the ridge shingle, except that it is constructed to bend in the opposite direction to fit into valleys for adjoining roofs and can be used alone with proper sealant or with the existing flashing. Flashing is usually a metal bent to fit the valley and is used where roofs adjoin or around structures such as chimneys. The valley shingle 106 also is formed with an integral split base plate 126 and a flexible strip 128, similar to that of the ridge shingle 104.

Figure 18:
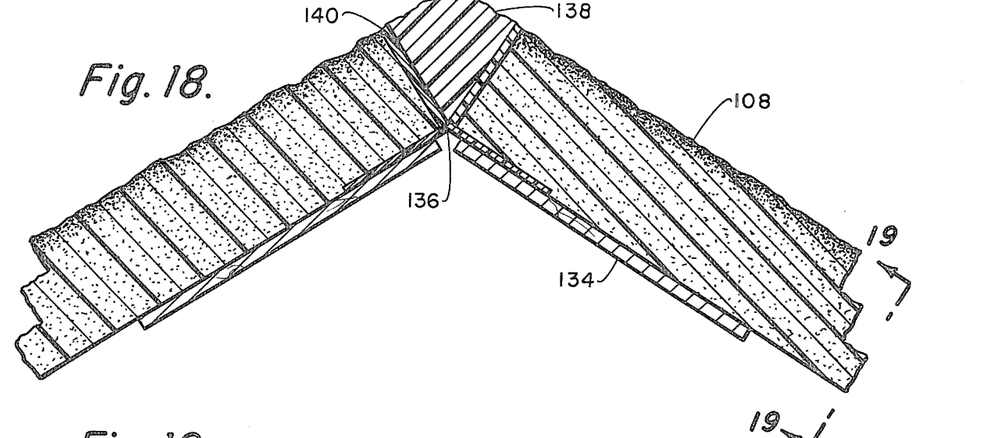
FIG. 18 illustrates the construction of a ridge terminal shingle and is a sectional view taken at 18—18 of FIG. 15.
Figure 19:
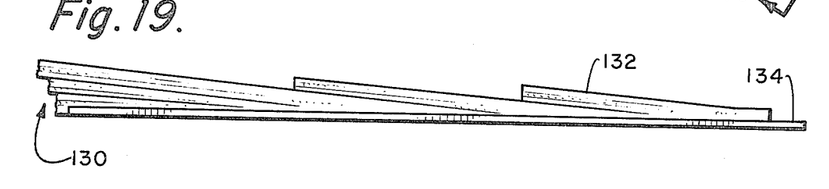
FIG. 19 is a side elevation of the ridge terminal of FIG. 18 taken at 19—19.

In most cases the ridge of a roofing system has a ridge terminal comprised of stacked shingles tapering down to a single layer toward the center of the ridge and completed with a ridge cap. The ridge terminal or stacked shingle configuration is illustrated in FIGS. 18 and 19 where the ridge terminal 108 has a triple shingle appearance on its edge, as illustrated in FIG. 19 at 130, tapering down to a single shingle at 132, having a stepped base plate member 134. The base member 134 is attached as with the roofing sections and a flexible strip 136 incorporated into the structure to allow for bending to fit various roof pitches. Since the ridge terminal 108 is considerably thicker than the usual ridge shingle 104, and produces a large gap, a terminal wedge 138 can be provided having a semi-diamond shape fitted into the V-groove and sealed with a suitable adhesive 140. The terminal wedge 138 could be constructed or cut from the existing roofing sections or separately made in a suitable mold employing the process of the present invention.

Figure 20:
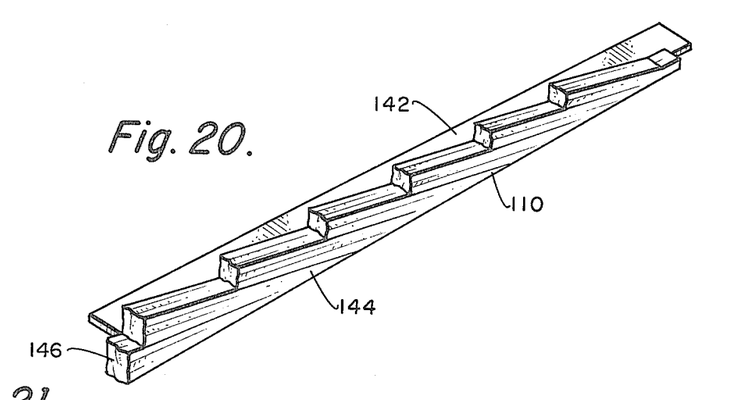
FIG. 20 is an isometric view of a starter gable for the beginning edge of the roof and is a detail of the area at 20 in FIG. 15.
Figure 21:
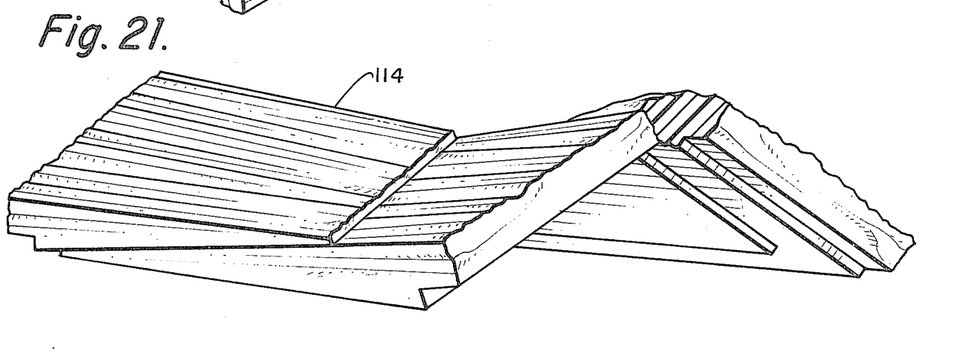
FIG. 21 is a detailed elevation of a ridge cap shingle taken at 21 of FIG. 15.

The usual practice in finishing a roof is to cover the ridge from both ends towards the center and then apply a cap 114 to finish the ridge. The cap has the appearance of overlapping shingles, as illustrated in FIG. 21 and would employ the flexible strip as well as a split base plate in a manner similar to the ridge shingles 104 and ridge terminals 108. To provide a finished look to the roofing system, a starter gable 110 is provided for the edge of the gables and a starter course 112 is provided for the eaves. These two particular shingles would be constructed in a manner similar to the roofing sections, but would have a portion of the foam covering an edge of the base to provide a finished look. For example, the starter gable 110 would cover the base interlocking piece along the outside edge as shown at 144, and the end as shown at 146. This would interlock with the roofing sections providing a finishing edge for the gable of a roofing structure.

Figure 22:
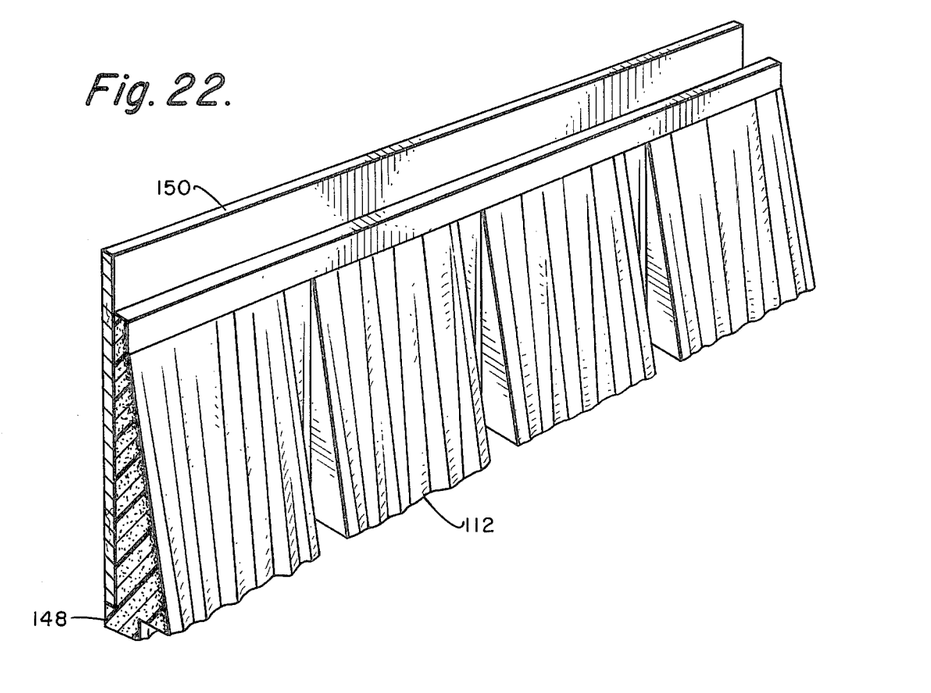
FIG. 22 illustrates a starter course shingle for the eave of a roof and is a detail view taken at 22 of FIG. 15.

The starter course 112 would fit on the eave of the roof as shown at the detail 22 of FIG. 15 and would have a portion of the foam at 148 covering the base plate 150. Preferably the starter gable 110 and starter course 112 would be constructed in special molds made for the purpose employing the principles of the invention, and could be cut from the roofing sections with foam filled in to cover the base members. It would be preferable, however, to form mold this particular shingle construction to provide a finished look to the roofing system. It should be noted that the starter course 112 would have a length similar to a roofing section 102, but would only have a width approximately one-third thereof. That is, where the roofing sections of FIG. 1 have the appearance of three rows of shingles. The starter course shingle is preferably only a single row.

Figure 23:
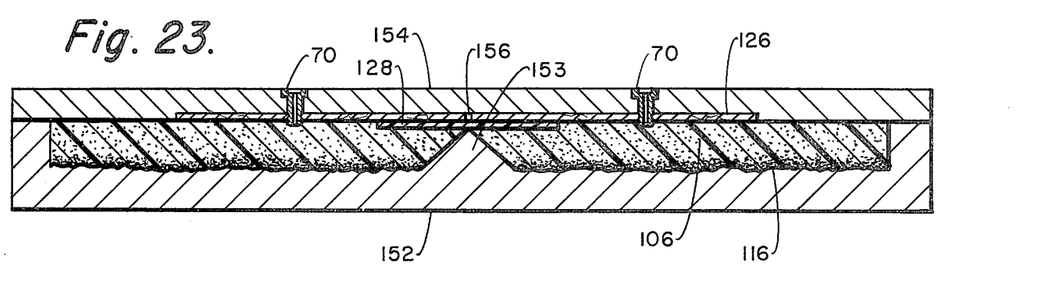
FIG. 23 illustrates the modification to the form mold of FIG. 3 for manufacturing the valley shingle of FIG. 17.
Figure 24:
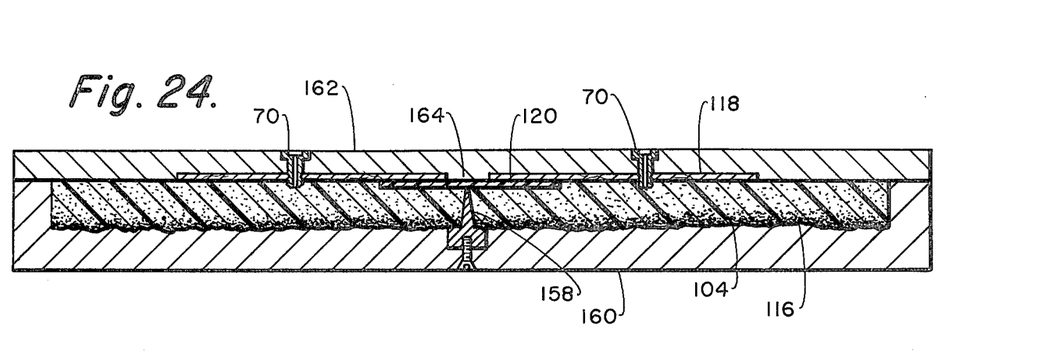
FIG. 24 illustrates a modification of the form mold of FIG. 3 for manufacturing the ridge shingle of FIG. 16.

The process of making these particular shingles is identical with the process illustrated in U.S. Pat. No. 4,028,450, with variations in the mold to accommodate the various structures and in particular the variations for the ridge and valley shingles as illustrated in FIGS. 23 and 24. As before, a 10–30 mil barrier coat 33, preferably of polymerized acrylic would be applied to the surface of a mold covered with a parting agent, such as Teflon. In FIG. 23 the mold for manufacturing the valley shingle would be provided with a wide ridge 153 traversing the length of the mold separating the shingle 106 into two sections. The split base 126 would be attached to the pressure plate 154 having a separation 156 with the usual vent screws 70 as in the method shown in U.S. Pat. No. 4,028,450. Before covering the mold with the pressure plate 154, the flexible strip 128 is applied to the split base 126 across the separation 156. In forming this valley shingle 106, the mold would be chilled by being placed or passed through a cool environment or chilled in a compartment. Preferably the mold is chilled from 10° to 30° F. below ambient temperature, but not sufficient to cause any condensation on the mold surfaces. The foam is then sprayed or then poured into the mold and the pressure plate 154 attached, as described in the process U.S. Pat. No. 4,028,450. The chilling of the mold cavity causes a retarding action in the surface of the foam which will give a denser surface skin, providing a homogeneous construction and eliminating the necessity for two different materials for forming these shingles. The chilling of the mold enhances the production of an integral surface covering 116, having a density of four to ten times or more density than the interior or central portion of the shingles. After the pressure plate 154 is secured, expansion and curing of the foam can be accelerated by heating the mold, if desired. Heating the mold in an oven at 100° to 140° should be adequate.

The ridge shingle 104 is formed in a manner substantially similar to that of the valley shingle, with the exception that an elongate knife blade 158 is provided in the mold 160 with the blade contacting the flexible strip 120 attached to the separated base members 118. The pressure plate 162 has an area or step 164 to provide a gap between the base members 118 sufficient to accommodate a variety of pitches of roofs. That is, when the ridge shingle is bent to cover a ridge, as illustrated in FIG. 16, the step 164 must be sufficient to prevent the split base 118 from coming into contact limiting the pitch. The blade 158 traverses the length of the mold 160 and can be formed integrally with the mold or as an insert. The split base 118 is attached by the vent screws 70 as hereinbefore described.

Suitable molds for forming the ridge terminal, starter gable, starter course and ridge cap shingles can be easily designed, utilizing the principles described with respect to the ridge and valley shingles and the roofing sections disclosed in FIGS. 1 through 6. The only requirement is that the process be identical and the dense, homogeneous, integral surface skin construction be conformed to.

Referring back to FIG. 15 there is shown a synthetic foam roofing system for attachment to new or existing roofs. For attachment to old roofing, wood batting 168 may be necessary in areas where the building codes would not allow nailing through the exposed surface of the synthetic foam roofing system. The wood batting 168 can be in suitable strips of suitable thickness formed in the manner shown at the broken part of the roof illustrated at 170. The spacing of the batting 168 would be predetermined by the spacing of the rafters and the length of the synthetic foam shingle sections. The batting 168 would be positioned to be under the exposed portion of the base members 1 of the shingle sections illustrated in FIG. 1 with nails used to secure the batting 168 to old existing roofing. Adhesive sealant 6 and nails 11 would then be used to secure the foam shingles to the batting 168 in a manner illustrated in FIGS. 1 and 2.

In some cases it may be allowable to nail through the exposed surface of the foam shingle and batting 168 would then not be necessary. The shingles would then be applied on top of existing roofing and nails 11 and adhesive sealant 12 used to secure the foam shingle. When driving a nail through the foam itself, the hole formed by the head of the nail could then be sealed with a suitable adhesive sealant. The sealant would obviously incorporate a coloring agent of the type and similar to the barrier coat of the shingle.

On a new roof or an existing roof utilizing the batting 168, where the roof has a gable, a starter gable 110 would be installed first. From the starting gables, starter course shingles may then be installed along the eave of the roof. After this, the standard size sections of sheet foam shingle at 102 would be installed with successive sections added, until the standard size shingles reach the ridge of the roof. The ridge shingles 104 would then be installed starting with ridge terminal 108 and working toward the center of the ridge. Ridge shingles 104 and ridge terminals 108 would also be used on hip sections illustrated at 172. Valley shingles 106 would be installed with or without metal flashing with the two sides of the valley shingle bent to match the pitch of the valley. Before installing the ridge shingles 104, or the cap shingle 114 when completing the ridge, excess portions of shingle sections or ridge shingles are cut back with conventional tools so that the base members of the ridge shingles interlock and fit properly. This is done by first cutting both the foam 3 and base member 1, then removing a portion of the foam from the base member. Once the cut is made, the excess foam is shaved off to leave a mating area of the base plate of a particular ridge or roofing section which mates with the overlapping foam of the adjacent particular shingle. All cut areas of foam must be covered with a barrier coat, preferably of a polymerized acrylic or equivalent.

Thus there has been disclosed a novel shingle having a durable dense construction with a dense, highly weather-resistant and flame-retardant skin formed with a barrier coating on the outer or exposed surfaces and progressing to a high-density foam beneath. Also disclosed are various shingles conceived to provide a complete roofing system for use with existing roofs or on new roofs with various shingles provided for ridges, valleys, hips and roof edges.

Although specific embodiments of the invention have been described in detail, it should be understood that the invention is susceptible to numerous modifications and embodiments within the attainment of one skilled in the art and without the exercise of the inventive faculty.

What is claimed is:
1. A method of molding a composite foam synthetic resin product in an open cavity mold comprising:
   providing an open cavity mold having a step along a first end and first side of said mold cavity;
   applying a barrier coat to the inside surface of said mold cavity;
   providing a pressure plate cover having a stepped portion along one side and one end said stepped portion adapted to engage a second side and end of said mold cavity;
   detachably securing a base member to said pressure plate with a side and end of said base member abutting the stepped portion of said pressure plate;
   chilling the mold in a chilling compartment to chill the surfaces of the mold cavity;
   injecting a foamable thermosetting resin reaction mixture into the chilled mold cavity;
   securing the pressure plate and attached base member into said mold with said base member lying on the stepped portion along the first side and end of said mold cavity;
   curing the resin reaction mixture for a period of time sufficient to permit it to foam and adhere to said base member;
   removing said pressure plate from said mold after completion of curing; and
   detecting the composite foam synthetic resin product from said pressure plate whereby a portion of the base member along one side and one end is exposed and a portion of the foamed resin reaction mixture is exposed along the opposite side and end of said product.
2. The method according to claim 1 wherein:
   said stepped portion along a first side of said mold cavity terminates in two additional steps; and
   said stepped portion along one end of said pressure plate comprises a pair of steps adapted to engage and fit into the two additional steps at the termination of the steps of the portion alongside said cavity.
3. The method according to claim 2 including:
   providing a half-hinge along one end of said mold;
   fitting the half-hinge of said pressure plate to the half-hinge of said mold whereby the stepped portions of the pressure plate and mold cavity are automatically positioned with respect to each other.
4. The method according to claim 1 including:
   controlling the temperature in said chilling compartment to prevent condensation on the surfaces of said mold cavity, whereby the curing of the surface of the foam is retarded, creating a thicker surface skin.
5. The method according to claim 4 wherein the temperature of said chilling compartment is controlled to be in the range of no more than 10° to 30° F. below ambient temperature.
6. A method of molding a composite foam synthetic resin product having a stepped portion on at least one edge thereof comprising the steps of:
   chilling the surface of a barrier-coated, contoured cavity of an open mold having an internal stepped section about a portion of the periphery of said cavity;
   introducing into the cavity of said mold a foamable thermosetting resin reaction mixture;

temporarily attaching a relatively broad surface reinforcing base member into a stepped portion of a pressure plate for said mold;

placing said pressure plate with said base member attached thereto on said mold with said base member fitted into said stepped section of said mold;

securing said pressure plate to said mold, permitting said reaction mixture to foam, cure and unite to said base member;

removing said pressure plate from said mold with the composite foamed resin structure attached thereto after the thermosetting resin foam has cured; and removing the composite foam synthetic resin product from said pressure plate.

7. The method according to claim 6 wherein the chilling step comprises:

chilling said mold in a temperature controlled chilling compartment to prevent condensation on the surface of said mold whereby curing at the surface of said foam is retarded creating a thicker skin.

8. The method according to claim 7 wherein the temperature in said chilling compartment is controlled to be in the range of no more than 10° to 30° F. below ambient temperature.

* * * * *